July 5, 1949.
E. P. JONES
2,475,141
PROCESS OF CONCENTRATING AQUEOUS RUBBER
DISPERSION BY CENTRIFUGING
Filed Oct. 29, 1946
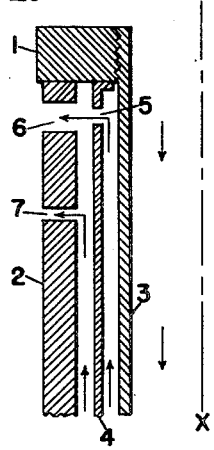
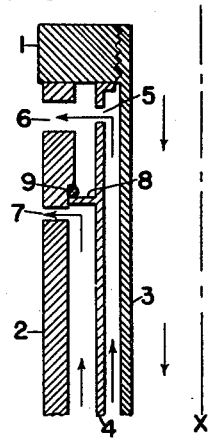
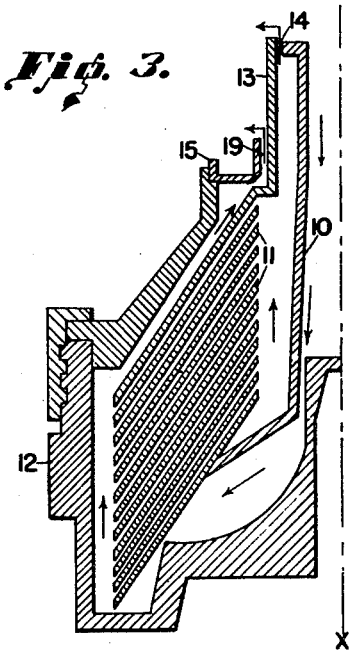
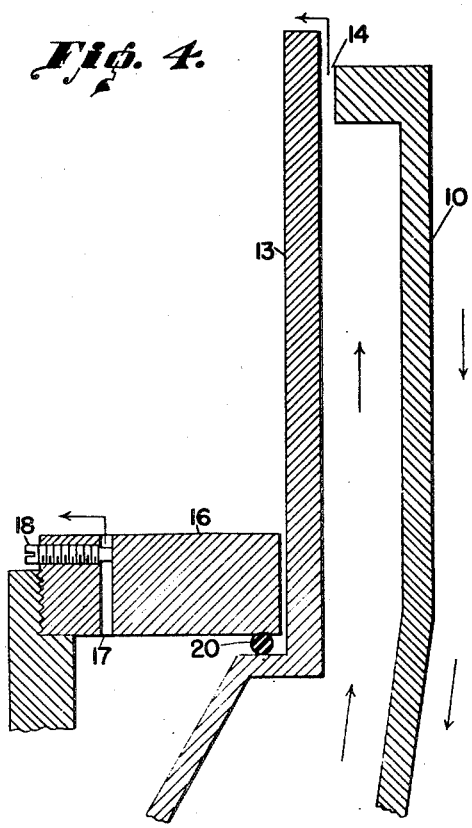
INVENTOR
EDWIN P. JONES
H. N. Foss
L. M. Manties
BY
ATTORNEY Patented July 5, 1949

2,475,141

UNITED STATES PATENT OFFICE 2,475,141

PROCESS OF CONCENTRATING AQUEOUS RUBBER DISPERSION BY CENTRIFUGING

Edwin P. Jones, Salinas, Calif., assignor to the United States of America as represented by the Secretary of Agriculture Application October 29, 1946, Serial No. 706,495

2 Claims. (Cl. 233—47)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention is directed to an improvement in concentrating dilute dispersions of rubber. It relates in particular to the concentration of dilute dispersions of rubber particles which have been produced by comminuting the lush guayule shrub in aqueous media. The dispersions so produced from the freshly harvested shrub vary in rubber concentration from about 0.7 to about 1.5 percent, by weight, and contain dissolved or dispersed cell contents as well as very fine suspended plant solids. My process is aimed at concentrating this dispersion to about 35 percent rubber in order to be comparable to latex as it leaves the commercial tree, that is, Hevea latex.

An object of this invention is to provide a continuous process of concentrating dilute guayule rubber dispersions utilizing a centrifuge in a manner such that little or no pasty or firmly coagulated rubber is formed in the bowl of the unit to interfere with the efficiency of separation.

A further object is the design of a centrifugal separator to permit continuous concentration of dilute guayule rubber dispersions.

In my process continuous delivery of cream, that is, rubber concentrate, and serum is attained by completely sealing all serum discharge openings of the bowl, except for one adjustable orifice controlling the rate of serum discharge. I then feed the dispersion to be concentrated into the centrifuge at a rate in excess of the rate at which serum is allowed to leave the bowl, which in turn causes a positive continuous displacement of the cream or rubber-rich phase adjacent to the central tubular shaft. The time during which rubber particles remained in the bowl is thereby controlled. If individual rubber particles stay in the bowl for an excessive period of time, they will be converted into a solid or semi-solid mass and seriously interfere with the operation of the machine.

In the accompanying drawings Figure 1 is a vertical cross section of the top or discharge area of the bowl of a small milk separator; Figure 2 shows the top of the same bowl after modification to carry out my process; Figure 3 is a cross section of half of the bowl of a commercial latex separator; Figure 4 shows an enlarged view of the top section of the bowl of Figure 3 after being modified to render my continuous process operable.

The separator of Figure 1 rotates about the axis X. Dilute guayule dispersion or latex enters the bowl through a plurality of holes, not shown, at the base of the tubular shaft 3. The arrangement of separating discs causes the rubber particles, which are under a centrifugal force about 7,000 times that of gravity, to migrate toward the tubular shaft or center of the bowl. This rubber-rich liquid, called cream, rises, because of its lower specific gravity, is collected by an imperforate top collecting plate or disc, and then flows upwardly in the passage between shaft 3 and neck 4 of the said top collecting plate, finally leaving through one or more holes 5 and then through a corresponding set of holes 6 in the neck 2 of the outer shell of the bowl. The upper end of the neck is closed by annular ring 1. The heavier phase, the serum, migrates away from the center of the bowl, being forced to outer portion of the bowl and conducted upward into the annular space between 2 and 4 where it is discharged through an adjustable hole or orifice 7, for separate collection.

When concentrating the relatively dilute guayule dispersions a large quantity of the dispersion must be fed before the difference in specific gravity, required to establish the difference in head, is sufficient for discharge of the cream. During this interval, the rubber particles coalesce to a viscous paste or form a firm mass of coagulated rubber, interfering with the continuous discharge of cream. If dispersion is fed continuously thereafter, it either overflows the top of the bowl without having been concentrated, or else the serum discharges from both 6 and 7.

The above phenomenon does not take place when milk is concentrated in the unit because the globules of butterfat are relatively stable. Rubber particles from guayule, however, are relatively unstable to mechanical stress, which fact is no doubt responsible for the failure of the separator to function properly with dilute guayule dispersions.

Figure 2 shows the top of the same bowl after modification to seal the annular space between collecting plate neck 4 and bowl neck 2. The inside diameter of the bowl neck is enlarged to form a shoulder below the cream outlet 6 and just above the serum outlet 7. A metal ring 8 is soldered or welded or otherwise affixed to the neck 4, at a short distance below the shoulder. A rubber sealing gasket 9 prevents the serum in the annular space between 2 and 4 from rising and leaving the bowl via the cream discharge 6. The rate of outflow of the cream may be effectively controlled either by means of the adjustable orifice 7, or by the regulation of the rate of input of dispersion to the bowl. Orifice 7 may be made adjustable by any conventional device, such as a serum screw therein.

The serum screw may be adjusted to deliver any part of the input. Assuming a constant input of 10 gallons per hour of a 1 percent dispersion, the serum screw may be adjusted to deliver any part of this input. If it is adjusted to deliver 9 gallons per hour of cream, 90 percent of the input, then the cream outlet will deliver 1 gallon per hour of cream whose rubber concentration will be slightly less than 10 percent. With this adjustment, the cream as it approaches the tubular shaft is progressively displaced upwardly by the dispersion entering the bowl and not because of the slightly lower specific gravity of the cream. Thus the time during which any rubber particle remains in the bowl is positively controlled, and satisfactory concentration of the relatively unstable dispersion may be accomplished.

Modification of the commercial latex separator was accomplished in a similar manner. Figure 3 shows a diagrammatic cross section of half of the bowl of the machine before alteration. The bowl rotates about its axis of rotation X and the dispersion as it enters at the top is conducted by a tubular shaft 10 into the bottom of the bowl 12. The liquid at this point is distributed between the separating discs 11 by means of holes in same, not shown, which are immediately above each of several distributing channels formed by slots in 10 and the central part of the bottom of the bowl.

The cream or rubber-rich liquid migrates toward the tubular shaft 10 and as the concentration of rubber near the shaft increases, it is collected by the top imperforate plate 13 and rises to the cream discharge 14 where it leaves the bowl. The serum or rubber-poor liquid migrates away from the axis of rotation and is conducted into the annular space between 13 and the bowl cover and leaves the bowl in the space between the ring dam 15 and plate 13 at 19. Outlet 19 is not a restricted opening. This machine could not be made to deliver cream continuously before modification.

Figure 4 shows an enlarged section of the upper part of Figure 3 after modification of the ring dam and insertion of a gasket as will be described. Ring dam 15 of Figure 3 was replaced by a new ring dam 16 through which two ⅛ inch holes 17 had been bored 180 degrees apart. Throttling or adjustable screws 18 served to constrict each hole and thus to regulate the flow of serum. The rubber gasket 20 effectively prevents the serum from escaping into the annular space between the ring dam 16 and the neck of the top collecting plate 13. After modification had been effected, guayule dispersions could be concentrated satisfactorily because we could control the time during which any rubber particle remained in the bowl of the machine.

The maximum permissible time during which a rubber particle should remain in the bowl for satisfactory operation may be established experimentally and is a function of the technique used in comminuting the shrub and processing the dispersion for concentration. A ten-fold increase in rubber concentration is easily attainable. Dispersions prepared from mature guayule shrub are more stable and easier to process than those of young shrub and satisfactory operation ensues when the increase in rubber concentration with one passage through the machine is as great as twenty-fold. This corresponds to a cream output of about 5 percent of the throughput into the unit.

Without this modification, discharge of cream, at a greater vertical height than that represented by the distance between position 14 and the unrestricted opening 19 of Figure 3, can take place only after the concentration of rubber in the area between 10 and 11 is sufficient to overcome this static difference in head of about 2½ inches. During the time required to bring this about, when feeding a dispersion containing from 0.6 percent to 1.5 percent rubber, the rubber which migrates toward the center of the bowl is converted into a pasty or buttery mass which interferes with the normal rise of cream between 10 and 11, and may completely clog the restricted passage cream outlet 14. During the time required for this to happen the total input volume flows out of the machine via the serum outlet 19, because it is unrestricted and no cream is delivered by the machine through 14.

However, insertion of the dam 16 and the gasket 20, shown in Figure 4, makes it possible to adjust screw 18 and to effectively throttle the serum output of the machine, which creates back pressure sufficient to overcome the 2½ inch static head and to force the liquid between 10 and 11 upwardly and out through unrestricted opening 14.

The range of ratios found especially applicable to guayule dispersions varied from 20 percent to 5 percent cream volume and 80 percent to 95 percent serum volume, depending upon the concentration of the rubber in the dispersion fed to the machine, and upon its stability. The modification suggested permits a complete coverage of from 0 percent to 100 percent cream at any input rate at any speed of the centrifuge.

The guayule dispersions may be prepared with tap water or with tap water containing dispersing, wetting, or stabilizing agents either alone or together with ammonia or other chemicals which do not adversely affect the stability of the rubber particle.

Having thus described my invention, I claim:

1. A continuous process of concentrating aqueous rubber dispersions having a rubber concentration of about 0.7 to about 1.5 percent by weight, in a centrifuge provided with a cream outlet and a throttled serum outlet separated by a dividing partition, comprising—after completely sealing to prevent discharge of serum toward the cream outlet and to prevent serum discharge other than that through the throttled serum outlet—initially and continuously feeding the said dispersion into the centrifuge at a rate in excess of the rate at which serum is allowed to leave the bowl of the centrifuge, removing the serum from the bowl through said throttled serum outlet and throttling the outflow of serum therethrough to create back pressure sufficient to cause the dispersion entering the bowl to continuously displace the rubber-rich cream toward the center of the centrifuge and upward to the cream outlet, and continuously removing cream from the cream outlet, whereby the time during which a rubber particle remains in the centrifuge is controlled and clogging of the centrifuge by formation of solid or semi-solid masses of rubber is prevented.

2. A continuous process of concentrating a guayule rubber dispersion having a rubber concentration of about 0.7 to about 1.5 percent by weight, in a centrifuge provided with a cream outlet and a throttled serum outlet separated by a dividing partition, comprising—after completely sealing to prevent discharge of serum toward the cream outlet and to prevent serum discharge other than that through the throttled serum outlet— initially and continuously feeding the said dispersion into the centrifuge at a rate in excess of the rate at which serum is allowed to leave the bowl of the centrifuge, removing the serum from the bowl through said throttled serum outlet and throttling the outflow of serum therethrough to create back pressure sufficient to cause the dispersion entering the bowl to continuously displace the rubber-rich cream toward the center of the centrifuge and upward to the cream outlet, and continuously removing cream from the cream outlet, whereby the time during which a rubber particle remains in the centrifuge is controlled and clogging of the centrifuge by formation of solid or semi-solid masses of rubber is prevented, the throttling being accomplished by restricting the size of the serum outlet orifice without substantially modifying the distance of the serum outlet from the axis of rotation of the centrifuge.

EDWIN P. JONES.

REFERENCES CITED

The following references are of record in the file of this patent:

UNITED STATES PATENTS

| Number | Name | Date |
|---|---|---|
| 600,684 | Daseking | Mar. 15, 1898 |
| 971,593 | Christenson | Oct. 4, 1910 |
| 1,885,154 | Strezynski et al. | Nov. 1, 1932 |
| 2,138,468 | Ayres | Nov. 29, 1938 |